3,042,620
ANTI-SEEP AGENT

Neal E. Dry, U.S. Army, and William P. Scott, Ponca City, Okla., assignors to Continental Oil Company, Ponca City, Okla., a corporation of Delaware
No Drawing. Filed Mar. 9, 1959, Ser. No. 797,828
2 Claims. (Cl. 252—72)

This invention is concerned with preventing or retarding the seepage of liquids through pinholes and other small openings by the addition thereto of a minor amount of anti-seep agent, and it relates more particularly to preventing or retarding the seepage of antifreeze and similar compositions containing water used in automotive cooling systems.

There is a marked tendency of certain liquids such as antifreeze liquids of the ethylene glycol type, etc., when mixed with water, to escape by seepage through minute openings in the coolant system. This phenomenon apparently results from improved wetting of the walls of these pinholes, capillaries, etc., by the addition of the ethylene glycol. Such wetting permits penetration of liquid into the pinhole and its subsequent escape from the radiator system. Various methods have been proposed to inhibit seepage of such liquids; but none have been entirely satisfactory. In one proposal a water insoluble oily material was added to the antifreeze which presumably wets the interior surface of these pinholes and thus reduces the loss of the glycol-water mixture which is incapable of wetting the oily surface. Such compositions, however, have a tendency to separate badly both in storage and in use.

It is, therefore, an object of the present invention to provide a composition which obviates the disadvantages of the prior art compositions. It is another object of our invention to provide an inhibitor which will significantly reduce the seepage of such liquids through small openings. These and other objects and advantages will become apparent as the invention is more thoroughly described.

These objectives are obtained by a process which, in brief, comprises adding to a liquid susceptible to seepage a minor amount of anti-seep agent. Suitable anti-seep agents include phosphonates, alkyl and alkyl substituted phosphates which are soluble in ethylene glycol and soluble or partially soluble in water solutions of ethylene glycol.

The maximum amount of such anti-seep agent which can be used in a single-phase antifreeze concentrate is, of course, limited by the solubility of the anti-seep agent in the ethylene glycol phase. Increases in amount of anti-seep above this level give two-phase antifreeze concentrates. Preferably, the antifreeze should be maintained as a single-phase within the container by limiting the amount of the anti-seep to within its solubility in glycol. This obviates the objection of phase separation and possible loss of additive due to inadequate mixing especially when only a portion of the antifreeze is used from the container.

Since ethylene glycol has a higher solvency for the anti-seep agents of this invention than does water, concentrates can be made which are single-phase but when diluted with water give two-phase systems. In other words, a single-phase antifreeze can be maintained within the packaging container which when added to the cooling system and diluted with water becomes a two-phase antifreeze.

Preferably, the antifreeze is a single-phase system both in the concentrated form and in the diluted form. This preference requires that the upper limit of the anti-seep additive be within solubility limits of an aqueous ethylene glycol solution. The lower limit must be such as will furnish sufficient anti-seep agent to prevent seepage. These criteria are met when the amount of the anti-seep agent based on the weight of the ethylene glycol solution varies from .01 to 2.0 weight percent.

The alternate use of an antifreeze which is single-phase in the container, but two-phase in the coolant system itself, is also considered suitable for purposes of this invention although it may cause some agglomeration of corroded particles and impeded heat transfer. Such an antifreeze incorporates more anti-seep agent to the extent that it exceeds the solubility limit of the coolant liquid and gives rise to a turbid mixture. This type of antifreeze is actually slightly more effective than the single-phase in reducing seepage but it is only suitable and not preferable. It is less economical and creates other problems as mentioned above which are not compensated for by the only slightly more effective anti-seepage properties.

The preferred anti-seep agent disclosed herein is tributoxy ethyl phosphate, but it has been determined that tributyl phosphate, tris-beta-chloroethyl phosphate, bis (beta chloroethyl) vinyl phosphate, mono-di-iso-amyl acid orthophosphate, mono-iso-amyl orthophosphate, mono-di-n-butyl acid orthophosphate, dibutyl acid pyrophosphate, dimethyl acid pyrophosphate, n-butyl acid phosphate, sec-butyl acid phosphate, ethyl ammonium phosphate, dibutyl butyl phosphonate, and diethyl ethyl phosphonate are also satisfactory anti-seep additives capable of satisfactory results to varying degrees. Suitable organic phosphorus compounds have the general formula

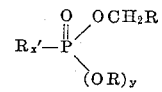

wherein R is hydrogen, alkyl or a substituted alkyl group, R' is an alkyl or a substituted alkyl group, $x$ is an integer varying from 0 to 2, and $y$ equals $2-x$. As to the solubility requirements the organic phosphorus compound must have a minimum solubility in ethylene glycol of .25 weight percent and a minimum solubility in a 40 percent aqueous ethylene glycol solution of .042 percent.

The addition of tributoxy ethyl phosphate as the anti-seep agent in an antifreeze compound which contains other normal inhibitors for the prevention of corrosion, etc., is not affected adversely by such other additives. It has been determined that the presence of other conventional additives such as borax actually significantly increases the effectiveness of the above anti-seep when it is added in amounts near the lower limit of suitability. Thereafter the addition of larger amounts of the anti-seep agent in the presence of other additives causes only a slight differential in the effectiveness of the anti-seep in antifreezes regardless of the presence of the above additives.

We have found that tributoxy ethyl phosphate, is effective in preventing seepage when added to the antifreeze composition over a range of concentrations. As a general rule it has been found to be effective within a range from .01 to 0.5 percent by weight of the antifreeze composition. Part of this range, however, gives a two-phase antifreeze in the coolant system. The preferred range is from .05 to 0.15 percent by weight of the antifreeze composition, which produces a single-phase antifreeze with the most efficient utilization of the anti-seep agent.

In order to disclose more clearly the nature of the present invention and the advantages thereof, specific examples of certain embodiments of this invention which illustrate the flexibility of the hereindescribed anti-seep agent are given. It should be clearly understood, however, that this is done solely by way of example and is not to be construed as a limitation upon the spirit and scope of the appended claims.

PARTS BY WEIGHT

| Example No. | Percent Additive in Ethylene Glycol | | | Solubility of Anti-Seep Agent (Antifreeze Appearance) | | Creepage of 40 Percent Antifreeze Solution in Water [1] |
|---|---|---|---|---|---|---|
| | Tributoxy Ethyl Phosphate | Sodium Tetraborate Decahydrate | Water | Concentrate | 40 Percent Antifreeze Solution in Water | |
| 1 | 0.00 | 0.0 | 0.0 | | | 4.25 |
| 2 | 0.01 | 3.0 | 2.0 | Clear | Clear | 3.00 |
| 3 | 0.02 | 0.0 | 0.0 | do | do | 3.00 |
| 4 | 0.05 | 0.0 | 0.0 | do | do | 2.43 |
| 5 | 0.05 | 3.0 | 2.0 | do | do | 2.28 |
| 6 | 0.10 | 0.0 | 0.0 | do | do | 2.14 |
| 7 | 0.10 | 3.0 | 2.0 | do | do | 2.12 |
| 8 | 0.15 | 0.0 | 0.0 | do | do | 2.00 |
| 9 | 0.15 | 3.0 | 2.0 | do | do | 2.00 |
| 10 | 0.25 | 0.0 | 0.0 | do | Hazy | 1.77 |
| 11 | 0.25 | 3.0 | 2.0 | do | Two-phase | 1.80 |
| 12 | 0.50 | 3.0 | 2.0 | do | do | 1.76 |

[1] Centimeters rise in capillary tubes of 0.50 mm. internal diameter, the rise of 3 mm. being established as the preferred limit of effective anti-seep properties.

The data in the table given above show that:

(a) The use of tributoxy ethyl phosphate reduces the creepage of the antifreeze composition within the operable limits in a range from .01 to 0.50 part by weight, as shown by Examples 2 through 12.

(b) The use of tributoxy ethyl phosphate reduces the creepage of the antifreeze composition within the preferable limits in a range from .05 to .15 part by weight, as shown by Examples 4 through 9.

(c) The antifreeze concentrate is a single-phase type at all times within the limits herein, as shown by Examples 2 through 12, but remains single-phase in aqueous dilutions to the addition of approximately 0.25 part by weight whereupon the solubility of said dilutions is surpassed and a two-phase antifreeze exists, as shown by Examples 10 through 12.

While particular embodiments of the invention have been described, it will be understood, of course, that the invention is not limited thereto since many modifications may be made, and it is therefore contemplated to cover by the appended claims any such modifications as fall within the true spirit and scope of the invention.

The invention having thus been described, what is claimed and desired to be secured by Letters Patent is:

1. The method of imparting anti-seepage properties to an aqueous ethylene glycol composition which comprises incorporating in said aqueous composition tributoxy ethyl phosphate as an anti-seep agent in an amount on a weight basis varying from about .01 to .50 part of the phosphate per 100 parts of the ethylene glycol.

2. The method of imparting anti-seepage properties to an aqueous ethylene glycol composition which comprises incorporating in said aqueous composition tributoxy ethyl phosphate as an anti-seep agent in an amount on a weight basis varying from about .05 to .15 part of the phosphate per 100 parts of the ethylene glycol.

References Cited in the file of this patent
UNITED STATES PATENTS

| 2,147,395 | Bayes | Feb. 14, 1939 |
| 2,751,356 | White et al. | June 19, 1956 |
| 2,786,033 | Gottshall et al. | Mar. 19, 1957 |

FOREIGN PATENTS

| 721,594 | Great Britain | Jan. 12, 1955 |